2 Sheets--Sheet 1.

D. M. LAMB.
Potato-Diggers.

No. 133,710. Patented Dec. 10, 1872.

WITNESSES.
Jas. L. Ewin
Walter Allen

INVENTOR,
Daniel M. Lamb
By Knight Bro
Attorney.

2 Sheets--Sheet 2

D. M. LAMB.

Potato-Diggers.

No. 133,710. Patented Dec. 10, 1872.

WITNESSES.
Jas. L. Ewin
Walter Allen

INVENTOR.
Daniel M. Lamb
By Knight Bros
Attorneys

UNITED STATES PATENT OFFICE.

DANIEL MARTIN LAMB, OF STRATHROY, CANADA, ASSIGNOR TO HIMSELF AND VAN RANSSELAER WARREN, OF BOSTON, MASSACHUSETTS.

IMPROVEMENT IN POTATO-DIGGERS.

Specification forming part of Letters Patent No. 133,710, dated December 10, 1872; antedated December 4, 1872.

*To all whom it may concern:*

Be it known that I, DANIEL MARTIN LAMB, of Strathroy, in the county of Middlesex, Province of Ontario, and Dominion of Canada, have invented a new and Improved Deep and Shallow Earth-Pulverizer and Potato-Digger, of which the following is a specification:

Nature and Objects of the Invention.

My improved implement is provided with any desirable number of teeth, arranged abreast of each other in one line or rank, and so constructed as to adapt them to stir and so effectually pulverize the ground as they are drawn through it. The teeth are attached to the frame in a manner which permits them to be removed and replaced with great facility. The frame is further provided with adjustable standards, having wheels at their lower ends by which the implement is supported and the depth of penetration of the teeth regulated, as required. The draft pole or tongue is hinged to the frame, and a rod or chain passing backward from the tongue and engaging with a hook upon the frame may be made to support the teeth out of the ground, as hereinafter described, when the implement is to be moved from place to place.

Figure 1:
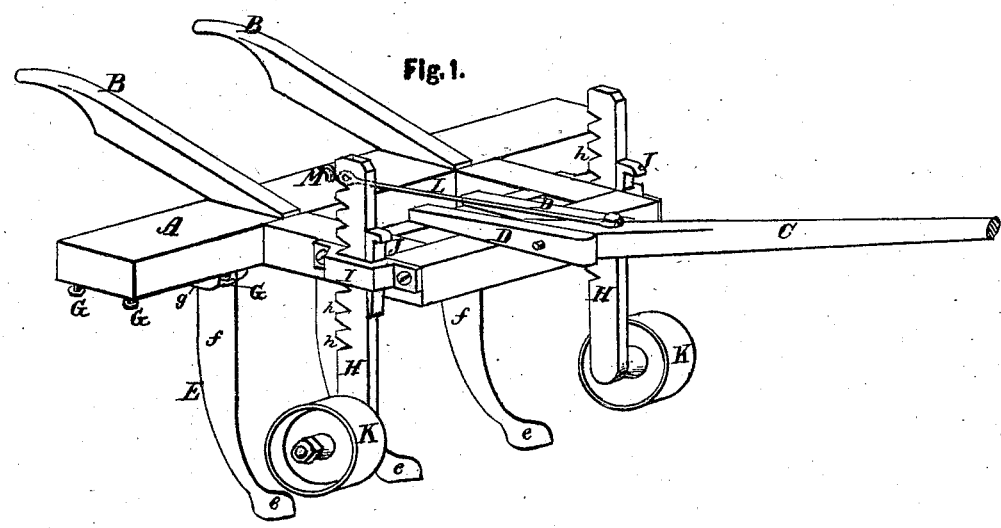
Figures 2, 4:
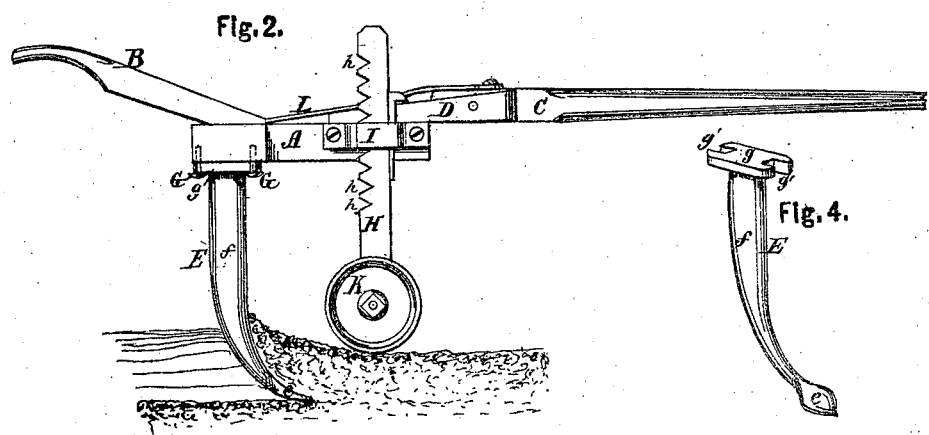
Figure 3:
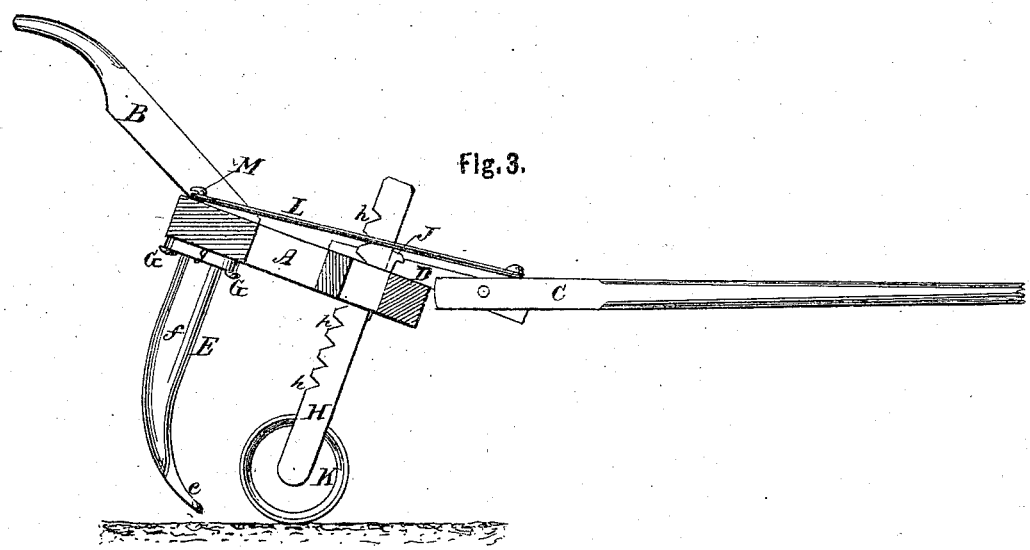

In the drawing, Figure 1 is a perspective view of an implement illustrating my invention; Fig. 2 is a side elevation of the same; Fig. 3 is a vertical section of the implement illustrating the mode of supporting the teeth in an elevated position when they are not to penetrate the soil; and Fig. 4 is a perspective view of one of the teeth.

A A are parts of the main frame of the machine, and B B handles projecting backward therefrom. C is a tongue, pivoted to the frame between hounds D D. E E are the teeth, one of which is shown detached in Fig. 4. This tooth is constructed with a point or share, *e*, a sword or standard, *f*, made wide in the direction of motion of the implement, and quite thin transversely, and an attaching flange or bracket, *g*, at top formed with notches *g'* to receive the bolts or screws G, by which the teeth are attached to the frame. H H are adjustable standards, fitted to slide up or down within the sockets I. By means of a series of notches, *h h*, in one edge of the standard, engaging with a lip or other projection in one side of the socket, and a wedge-shaped key, J, driven in at the other side, the standards are secured at any height. K K are wheels running on stud-shafts at the lower ends of the standards H. The said wheels rest upon the ground and regulate the depth of penetration of the teeth or support them clear of the earth, as required. L is a rod or chain, bolted at its forward end to the tongue and resting on the main frame when not in use.

When the implement is to be moved from place to place, without having the teeth penetrate the ground, the rod or chain L is hitched to a hook, M, on top of the frame, so as to support the latter in an elevated position, as shown in Fig. 3.

In operation, the teeth may be made to penetrate to any depth from three to sixteen inches, as circumstances require. The teeth being adapted to be readily attached to the frame or detached therefrom, three, five, or any desirable number may be used, according to the character of the work or the strength of the team.

The effect of a rank or range of teeth of the form shown, arranged abreast of one another, is to stir and completely break up the earth as far as they penetrate; and the fragments being ground and crushed one against another the whole surface becomes pulverized in the most thorough manner.

For light purposes—such as cultivating growing crops, digging potatoes, or pulverizing soil already plowed—a single horse may be used. For subsoiling or any heavy work two horses are used.

The ground may be thoroughly stirred and broken up to a depth of six inches or more below the depth of plowing.

Claims.

The following is claimed as new:

1. The teeth E E set in a single rank or line abreast of each other, in combination with the adjustable wheeled standards H *h* K, set in close proximity to said teeth to regulate the depth of penetration, all arranged to operate as set forth.

2. The combination of the frame A, hinged tongue C, rod or chain L, and supporting wheeled standards H K for holding the teeth out of the ground, the entire rigid frame being made to change its position in relation to the tongue, and held in position by the rod L, as explained.

DANIEL M. LAMB.

Witnesses:
OCTAVIUS KNIGHT,
WALTER ALLEN.